United States Patent
Hayduk

(10) Patent No.: US 8,645,954 B2
(45) Date of Patent: Feb. 4, 2014

(54) COMPUTING SYSTEM CAPABLE OF REDUCING POWER CONSUMPTION BY DISTRIBUTING EXECUTION OF INSTRUCTION ACROSS MULTIPLE PROCESSORS AND METHOD THEREFORE

(75) Inventor: Matthew A. Hayduk, Calgary (CA)

(73) Assignee: Intel Corporation, Santa Clara, CA (US)

( * ) Notice: Subject to any disclaimer, the term of this patent is extended or adjusted under 35 U.S.C. 154(b) by 741 days.

(21) Appl. No.: 10/017,047

(22) Filed: Dec. 13, 2001

(65) Prior Publication Data

US 2003/0115242 A1 Jun. 19, 2003

(51) Int. Cl.
*G06F 9/48* (2006.01)
*G06F 1/00* (2006.01)
*G06F 1/26* (2006.01)

(52) U.S. Cl.
USPC ............ 718/100; 713/300; 713/320; 713/322

(58) Field of Classification Search
USPC .......... 718/100, 102, 104, 105; 709/200–201; 707/10; 713/300, 320
See application file for complete search history.

(56) References Cited

U.S. PATENT DOCUMENTS

| | | | |
|---|---|---|---|
| 4,270,167 A * | 5/1981 | Koehler et al. ............... | 710/112 |
| 4,495,570 A * | 1/1985 | Kitajima et al. .............. | 718/105 |
| 5,339,445 A * | 8/1994 | Gasztonyi ..................... | 713/324 |
| 5,418,969 A | 5/1995 | Matsuzaki et al. | |
| 5,504,910 A * | 4/1996 | Wisor et al. .................... | 713/322 |
| 5,655,125 A | 8/1997 | Cloud et al. | |
| 5,812,860 A * | 9/1998 | Horden et al. ................ | 713/322 |
| 5,842,029 A * | 11/1998 | Conary et al. ................ | 713/322 |
| 5,991,884 A | 11/1999 | Lin et al. | |
| 6,195,756 B1 | 2/2001 | Hurd | |
| 6,292,822 B1 * | 9/2001 | Hardwick ..................... | 718/105 |
| 6,317,840 B1 | 11/2001 | Dean et al. | |
| 6,363,490 B1 * | 3/2002 | Senyk ........................... | 713/300 |
| 6,470,238 B1 * | 10/2002 | Nizar et al. ................... | 700/299 |
| 6,484,041 B1 * | 11/2002 | Aho et al. ..................... | 455/574 |
| 6,487,668 B2 * | 11/2002 | Thomas et al. ............... | 713/322 |
| 6,496,823 B2 * | 12/2002 | Blank et al. ..................... | 707/10 |
| 6,570,571 B1 * | 5/2003 | Morozumi ..................... | 345/505 |
| 6,745,335 B1 * | 6/2004 | Kusano .......................... | 713/324 |
| 6,804,632 B2 * | 10/2004 | Orenstien et al. ............. | 702/188 |
| 6,804,790 B2 * | 10/2004 | Rhee et al. ..................... | 713/320 |
| 6,836,849 B2 * | 12/2004 | Brock et al. ................... | 713/310 |
| 6,957,353 B2 * | 10/2005 | Bresniker et al. ............. | 713/320 |
| 7,043,650 B2 * | 5/2006 | Bresniker et al. ............. | 713/324 |
| 7,203,846 B2 * | 4/2007 | Bresniker et al. ............. | 713/300 |
| 2002/0138778 A1 * | 9/2002 | Cole et al. ..................... | 713/330 |
| 2003/0012143 A1 * | 1/2003 | Chen et al. .................... | 370/252 |
| 2003/0023885 A1 * | 1/2003 | Potter et al. ................... | 713/300 |
| 2005/0050373 A1 * | 3/2005 | Orenstien et al. ............. | 713/320 |

* cited by examiner

*Primary Examiner* — Jennifer To
(74) *Attorney, Agent, or Firm* — Cool Patent, P.C.; Joseph P. Curtin

(57) ABSTRACT

Briefly, in accordance with one embodiment of the invention, a portable communication device includes multiple processors having a monitor. The monitors of the processors may consult to determine which processor is best suited to execute a set of instructions.

19 Claims, 1 Drawing Sheet

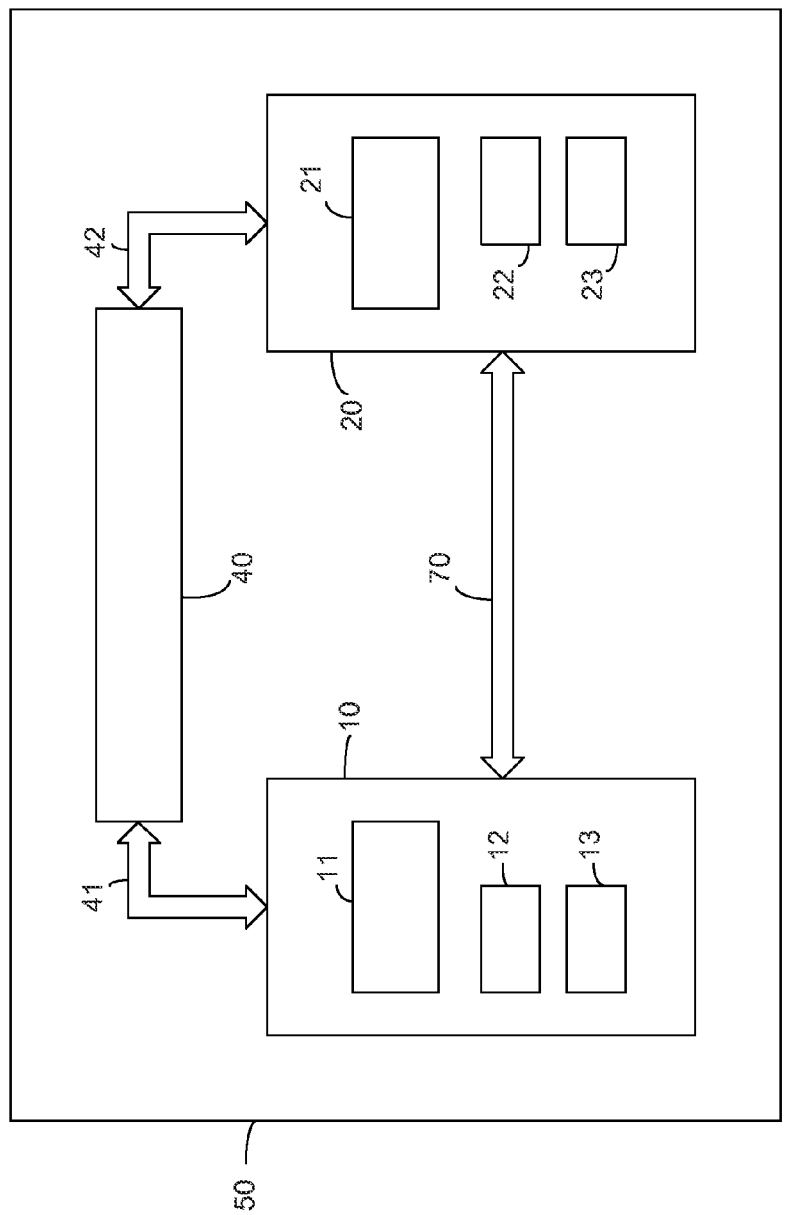

COMPUTING SYSTEM CAPABLE OF REDUCING POWER CONSUMPTION BY DISTRIBUTING EXECUTION OF INSTRUCTION ACROSS MULTIPLE PROCESSORS AND METHOD THEREFORE

BACKGROUND

To increase the overall performance of some computing systems, it may be desirable to design the computing system so that it includes two or more processors. The use of multiple processors typically increases the total available instruction cycles that may be used to execute instructions on the computing system. The number of instructions cycles available with a processor is typically measured in millions of instructions per second (MIPS), and it generally follows that the more MIPS associated with a computing system, the faster the computing system may be able to execute multiple programs (e.g., application programs, operation system programs, etc.)

The addition of multiple processors to a computing system may, however, significantly increase the total amount of power consumed by the computing system. Such an increase is typically not desirable in mobile computing systems as this may directly reduce the total available computing time due to the increase in the drain on the batteries.

Thus, there is a continuing need for better ways to reduce the power consumption of multiple-processor computing systems while providing increased execution capacity.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawing in which:

the sole FIGURE is a block diagram representation of a portion of a computing system in accordance with an embodiment of the present invention.

It will be appreciated that for simplicity and clarity of illustration, elements illustrated in the FIGURE have not necessarily been drawn to scale. For example, the dimensions of some of the elements are exaggerated relative to other elements for clarity.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general-purpose computing device selectively activated or reconfigured by a program stored in the device. Such a program may be stored on a storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. "Coupled", however may also mean that two or more elements are not in direct contact with each other, but yet still co-operate or interact with each other.

Turning to FIG. 1, an embodiment 100 in accordance with the present invention is described. Embodiment 100 may comprise a portable communication device 50, such as a mobile communication device (e.g., cell phone), a two-way radio communication system, a one-way pager, a two-way pager, a personal communication system (PCS), a portable computer, or the like. Although it should be understood that the scope and application of the present invention is in no way limited to these examples. Other embodiments of the present invention may include other computing systems that may or may not be portable or even involve communication systems such as, for example, desktop or portable computers, servers, network switching equipment, etc.

In this particular embodiment, portable communication device 50 may include two processors 10 and 20 that may execute instructions, such as instructions stored in a memory 40. Processors 10 and 20 may be one of a variety of integrated circuits such as, for example, a microprocessor, a central processing unit (CPU), a digital signal processor, a microcontroller, a reduced instruction set computer (RISC), a complex instruction set computer (CISC), or the like, although the scope of the present invention is not limited by the particular design or functionality performed by processors 10 and 20. In addition, in some embodiments, processors 10 and 20 may be the same processor, while in other embodiments they may be different. For example, in this particular embodiment processor 10 may comprise a CISC processor to execute general user applications while processor 20 may comprise a base band processor that may be used to initiate and receive wireless communications.

Memory 40 may comprise any variety of volatile or non-volatile memory, such as any of the types of storage media recited earlier, although this list is certainly not meant to be exhaustive and the scope of the present invention is not limited in this respect. In this particular application, memory 40 may comprise a variety of instructions to be executed by processors 10 or 20. Buses 41 and 42 may be used to allow processors 10 and 20, respectively, to access or store information and/or instructions stored in memory 40.

For example, memory 40 may be used to store sets of instructions, such as instructions associated with an application program, an operating system program, a communication protocol program, etc. For example, the instructions stored in memory 40 may be used to perform wireless communications, provide security functionality for portable communication device 50, user functionality such as 20 calendaring, email, internet browsing, telephony services, such as voice calls, SMS, call management, fax, or multimedia services such as MP3, speech recognition, voice memo pad, audio codecs, etc.

Processors 10 and 20 may comprise monitors 11 and 21, respectively, that may be used to determine, track, or predict the current operational characteristics of processors 10 and 20. For example, monitors 11 and 21 may comprise any combination of hardware and circuitry to determine the performance capability and consumption of processors 10 and 20. Simply stated, monitors 11 and 21 may be used to determine which of processors 10 and 20 is best suited to execute a set of instructions so as to take into account the amount of power consumed by portable communication device 50 and/or the desired performance characteristics of a user.

One technique to determine the performance capability of processors 10 and 20, although the scope of the present invention is not limited in this respect, is that monitors 11 and 21 may track or calculate the number of instructions that may be executed (e.g., the number of millions of instructions per second (MIPS) that may be executed). Such operational characteristics may be determined by tracking or monitoring one or more values within processors 10 and 20. For example, monitors 11 and 21 may monitor such values as the operational voltage potential (e.g., the voltage potential of a portion of a core within the processor), operational frequency (e.g., one of the internal synchronizing signals), number of wait states generated, the rate at which memory external to the processors is accessed, cache hit/miss rates, amount of current passing through all or a portion of the processors 10 or 20. Although it should be understood that this list is not exhaustive and alternative embodiments may use any combination of these characteristics or others.

Monitors 11 and 21 may comprise any combination of hardware and software. Hardware may include, although not necessarily limited to, latches, counters, and registers to record the number of instructions cycles or the number of instructions being executed by the corresponding processor. Although the scope of the present invention is not limited so as to involve any particular hardware or any hardware at all as alternative embodiments may implement monitors 11 and 21 using software.

In alternative embodiments, monitors 11 and 21 may be implemented all or in part through software, such as sets of instructions executed on processors 10 or 20. As shown in the FIGURE, processors 10 and 20 may comprise memory 13 and 23, which may include any of the types of memory recited earlier. Memory 13 and 23 may be used to store data to track the operational performance of the corresponding processor 10 or 20. For example, memory 13 and 23 may comprise registers or be capable of storing table(s) of data that are used to track the historical average that processors 10 and 20 have taken to execute particular sets of instructions. These tables may also be dynamically updated or averaged over time to so that the values in the table(s) represent more recent information on the overall resource consumption that processors 10 and 20 take to execute particular sets of instructions.

The table(s) may also keep track of the performance characteristics of processors 10 and 20 under various operational parameters. For example, although the scope of the present invention is not limited in this respect, the tables may keep track of the performance characteristics depending on such factors as the operational voltage, clock frequency, or depending on how many other instructions are currently being executed in processors 10 and 20 or within portable communication device 50.

Although the scope of the present invention is not limited in this respect, portable communication device 50 may also be adapted to store user parameters that may, among other things, allow a user to define or set the desired performance level(s) for executing particular instructions. Accordingly, when portable communication device 50 is to execute a new set of instructions (e.g., a user application in memory 40), it is first determined which of processors 10 and 20 is best suited to execute the instructions. An example will now be provided to illustrate how this determination may be made, although it should be understood that the scope of the present invention is not limited to this example.

In this embodiment, processors 10 and 20 are already executing other programs when a request is made to execute a set of instructions in memory 40 using processor 10. Monitor 11 may first determine the current performance characteristics of processor 10 using one or more of the techniques described earlier. Monitor 11 may then determine if processor 10 may execute the new set of instructions within the desired timeframe acceptable to the user. If processor 10 has sufficient bandwidth (i.e., may execute the set of instructions within acceptable parameters), then the set of instructions may be executed by processor 10.

On the other hand, if processor 10 cannot execute the set of instructions under the current operating parameters within sufficient time, then monitor 11 may poll the other processors (e.g., processor 20), to determine if the set of instructions may be executed by another processor. Although the scope of the present invention is not limited in this respect, monitor 11 may use a bus 70 to communicate with or consult with monitor 21 to determine if the set of instructions may be executed on processor 20. For example, bus 70 may be a serial or parallel bus that allows monitors 11 and 21 to share performance information about their respective processors 10 and 20. It should be understood that the scope of the present invention is not limited to any particular embodiment for how monitors 11 and 21 consult with each other. In alternative embodiments, this may be done at a layer three network level or at the link level. Alternatively, the consultation may take place through the use of interrupts and/or sharing data through memory 40.

Simply stated, monitor 11 consults with monitor 21 to determine if the set of instructions may be executed by processor 20 within the desired performance parameters. If processor 20 has sufficient bandwidth (i.e., sufficient capacity), responsibility for the execution of the set of instructions may be transferred from processor 10 to processor 20.

In yet another embodiment of the present invention, monitors 11 and 21 may consult to determine which processor is better suited to execute the set of instructions to either reduce the overall power consumption of portable communication device 50 or to execute the set of instructions in the least of amount of time. For example, even if processor 10 has sufficient capability to execute the set of instructions, it may be desirable to have the instructions executed by processor 20 instead while reducing the power consumption associated with processor 10 (e.g., reduce the operational voltage potential, reducing the clock frequency, etc.). Consequently, the set of instructions may get executed within an acceptable time frame while reducing the overall power consumption of portable communication device 50.

If monitor 21 indicates that processor 20 may not have the bandwidth to be able to execute the set of instructions within an acceptable time frame, monitor 11 may call for an increase in the operational parameters (e.g., operating voltage, clock frequency, etc.) of processor 10 that may increase the overall performance capability of processor 10. The increase in operational parameters may increase the MIPS available on processor 10 so that the set of instructions may be executed within an acceptable performance level. It should be understood that processors 10 and 20 may include circuitry that may be used to raise and lower operational parameters, such as voltage potential, clock frequency, etc.

In yet other alternative embodiments, algorithms may be used to adjust the operational parameters of processors 10 and/or 20 to balance the computing needs of portable communications device 50 with the overall power consumption of the processors within portable communication device 50. In other embodiments monitors 11 and 21 may be used to balance the programs and/or instructions that are executed by processors 10 and 20 so as to reduce the overall power consumption of portable communication device 50. Additionally, monitors 11 and 21 may be used to control the operational parameters of processors 10 and 20 so as to increase the overall performance of portable communication device 50.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. An apparatus, comprising:
   a first processor to execute a first set of instructions;
   a second processor to execute a second set of instructions;
   a first monitor adapted to determine whether the first processor will execute the first set of instructions to a predetermined acceptable performance level by monitoring an operational voltage potential of a portion of a core within the first processor, wherein the first monitor is further adapted to determine whether the first processor will execute the first set of instructions to a predetermined acceptable performance level by monitoring an operational frequency of the first processor, an internal synchronizing signal of the first processor, a number of wait states generated by the first processor, a rate at which memory external to the first processor is accessed, a cache hit/miss rate of the first processor, or an amount of current passing through all or a portion of the first processor, or a combination thereof; and
   a second monitor communicatively coupled to the first monitor and adapted to determine whether the second processor will execute the second set of instructions to the predetermined acceptable performance level, wherein the apparatus is adapted to execute a third set of instructions on the first processor when the second processor will not execute the third set of instructions to the predetermined acceptable performance level, and wherein the apparatus is adapted to maintain a database coupled to the first monitor to track an historical average of a processor demand associated with the first processor needed to execute the third set of instructions and to increase a power consumption of the first processor by increasing an operational parameter of the first processor if the first processor is unable to execute the third set of instructions to the predetermined acceptable performance level.

2. The apparatus of claim 1, further comprising memory to store the first, second, and third set of instructions.

3. The apparatus of claim 2, wherein the set of instructions comprise instructions of a program selected from the group consisting of an application program and an operating system program.

4. The apparatus of claim 1, wherein the first monitor is adapted to determine an available performance capacity of the first processor based on an operational frequency of the first processor.

5. The apparatus of claim 1, wherein the first monitor is provided, at least in part, by a fourth set of instructions being executed on the first processor.

6. The apparatus of claim 5, wherein the first monitor is provided in part by logic circuitry within the first processor.

7. The apparatus of claim 1, wherein the database includes an average million instructions per second (MIPS) taken to execute the third set of instructions.

8. The apparatus of claim 1, wherein the predetermined acceptable performance level is defined by a user.

9. The apparatus of claim 1, wherein the apparatus is adapted to increase an available performance capability of the second processor when an available performance capability of the first processor is less than the predetermined acceptable performance level to execute the third set of instructions on the first processor.

10. The apparatus of claim 9, wherein the apparatus is adapted to increase the MIPS available on the first processor.

11. The apparatus of claim 9, wherein the apparatus is adapted to increase an operational voltage potential of the first processor.

12. The apparatus of claim 9, wherein the apparatus is adapted to increase an operational frequency of the first processor.

13. A method comprising:
    polling a first processor to determine if the first processor has capacity to execute a first set of instructions to a predetermined acceptable performance level when a second processor does not have capacity to execute the first set of instructions to the predetermined acceptable performance level;

determining in response to the polling historical average execution requirements of the first processor for the first set of instructions by monitoring an operational voltage potential of a portion of a core within the first processor, wherein the determining in response to the polling historical average execution requirements of the first processor for the first set of instructions further comprises monitoring an operational frequency of the first processor, an internal synchronizing signal of the first processor, a number of wait states generated by the first processor, a rate at which memory external to the first processor is accessed, a cache hit/miss rate of the first processor, or an amount of current passing through all or a portion of the first processor, or a combination thereof; and reducing a power consumption of the first processor if the first processor has capacity to execute the first set of instructions to the predetermined acceptable performance level if the current operational parameters of the first processor are reduced.

14. The method of claim 13, further comprising determining an available capacity of the second processor while the second processor is executing a second set of instructions.

15. The method of claim 14, wherein determining the available capacity of the second processor includes determining an available million instructions per second (MIPS) of the second processor.

16. The method of claim 13, further comprising increasing the available capacity of the second processor if the capacity of the first processor is not sufficient to execute the first set of instructions within the predetermined acceptable performance level.

17. The method of claim 13, further comprising storing the historical average execution requirements in a table.

18. The method of claim 13, further comprising reducing the voltage potential of the first processor.

19. An article comprising a non-statutory storage medium having stored thereon instructions, that, when executed by a computing platform, results in:

polling a first processor to determine if the first processor has capacity to execute a first set of instructions to a predetermined acceptable performance level when a second processor does not have capacity to execute the first set of instructions to the predetermined acceptable performance level;

determining in response to the polling historical average execution requirements of the first processor for the first set of instructions by monitoring an operational voltage potential of a portion of a core within the first processor, wherein the determining in response to the polling historical average execution requirements of the first processor for the first set of instructions further comprises monitoring an operational frequency of the first processor, an internal synchronizing signal of the first processor, a number of wait states generated by the first processor, a rate at which memory external to the first processor is accessed, a cache hit/miss rate of the first processor, or an amount of current passing through all or a portion of the first processor, or a combination thereof; and reducing a power consumption of the first processor if the first processor has capacity to execute a first set of instructions to the predetermined acceptable performance level if the current operational parameters of the first processor are reduced.

* * * * *